United States Patent
Lee et al.

(10) Patent No.: US 8,571,355 B2
(45) Date of Patent: Oct. 29, 2013

(54) METHOD AND APPARATUS FOR RECONSTRUCTING A HIGH-RESOLUTION IMAGE BY USING MULTI-LAYER LOW-RESOLUTION IMAGES

(75) Inventors: Hyun-seung Lee, Seoul (KR); Gi-yeong Gim, Yongin-si (KR); Jong-hyun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 12/856,110

(22) Filed: Aug. 13, 2010

(65) Prior Publication Data

US 2011/0038558 A1  Feb. 17, 2011

Related U.S. Application Data

(60) Provisional application No. 61/233,609, filed on Aug. 13, 2009.

(30) Foreign Application Priority Data

Jan. 5, 2010  (KR) .................. 10-2010-0000579

(51) Int. Cl.
*G06K 9/40* (2006.01)
*G06K 9/32* (2006.01)

(52) U.S. Cl.
USPC .......................................... 382/299; 382/254

(58) Field of Classification Search
None
See application file for complete search history.

(56) References Cited

U.S. PATENT DOCUMENTS

| | | | |
|---|---|---|---|
| 6,208,765 B1 | 3/2001 | Bergen | |
| 6,381,279 B1 | 4/2002 | Taubman | |
| 6,804,419 B1 | 10/2004 | Miyake | |
| 7,477,802 B2 | 1/2009 | Milanfar et al. | |
| 2002/0172434 A1* | 11/2002 | Freeman et al. | 382/299 |
| 2007/0223887 A1* | 9/2007 | Kanamori et al. | 386/112 |
| 2007/0247547 A1 | 10/2007 | Liu et al. | |
| 2010/0066874 A1* | 3/2010 | Ishiga | 348/252 |
| 2010/0220939 A1* | 9/2010 | Tourapis et al. | 382/261 |

FOREIGN PATENT DOCUMENTS

| | | | |
|---|---|---|---|
| JP | 2006203717 A | 8/2006 | |
| JP | 2008199097 A | 8/2008 | |

OTHER PUBLICATIONS

Park et al., "Super-Resolution Image Reconstruction: A Technical Overview", IEEE Signal Processing Magazine, pp. 21-36, May 2003.
Farsiu et al., "Fast and robust multiframe super resolution," IEEE Transactions on Image Processing, vol. 13, No. 10, pp. 1327-1344, Oct. 2004.
Tomasi et al., "Bilateral filtering for gray and color images," in Proceedings of the 1998 IEEE International Conference on Computer Vision, Bombay, India, pp. 839-846, Jan. 1998.

(Continued)

*Primary Examiner* — Amir Alavi
*Assistant Examiner* — Kenny Cese
(74) *Attorney, Agent, or Firm* — Sughrue Mion, PLLC

(57) ABSTRACT

A method of reconstructing a high-resolution image by using multi-layer low-resolution images includes dividing a low-resolution image into a plurality of texture layer low-resolution images and a plurality of base layer low-resolution images; generating a texture layer high-resolution image by compositing the plurality of the texture layer low-resolution images and generating a base layer high-resolution image by compositing the plurality of the base layer low-resolution images; and outputting a high-resolution image by compositing the texture layer high-resolution image and the base layer high-resolution image.

28 Claims, 8 Drawing Sheets

(56) References Cited

OTHER PUBLICATIONS

Elad, "On the origin of the bilateral filter and ways to improve it," IEEE Transactions on Image Processing, vol. 11, No. 10, pp. 1141-1151, Oct. 2002.

Takeda et al., "Robust kernel regression for restoration and reconstruction of images from sparse noisy data," in Proc. IEEE Int. Conf. Image Processing, Atlanta, GA, pp. 1257-1260, Oct. 2006.

* cited by examiner

METHOD AND APPARATUS FOR RECONSTRUCTING A HIGH-RESOLUTION IMAGE BY USING MULTI-LAYER LOW-RESOLUTION IMAGES

CROSS-REFERENCE TO RELATED PATENT APPLICATION

This application claims priority from U.S. Provisional Patent Application No. 61/223,609, filed on Aug. 13, 2009, in the US Patent and Trademark Office, and Korean Patent Application No. 10-2010-0000579, filed on Jan. 5, 2010, in the Korean Intellectual Property Office, the disclosures of which are incorporated herein in their entirety by reference.

BACKGROUND

1. Field of the Invention

The present invention relates to resolution amplification of an image.

2. Description of the Related Art

As display devices are getting larger, a method of efficiently magnifying an image is needed. In order to magnify an image, a linear interpolation filter such as a bilinear filter, a bicubic filter or a Lanczos kernel-based filter may be used.

Also, a super-resolution image processing method is used to improve the quality of standard definition (SD) or high definition (HD) level video data. The super-resolution image processing method is based on an iterative calculation method of repeatedly processing an already-processed resultant image as an input image so as to obtain highly reliable image data.

SUMMARY

Exemplary embodiments provide a method and apparatus for reconstructing a high-resolution image by using multi-layer low-resolution images.

According to an exemplary embodiment, there is provided a method of reconstructing a high-resolution image by using multi-layer low-resolution images, the method including dividing a low-resolution image into a plurality of texture layer low-resolution images and a plurality of base layer low-resolution images; generating a texture layer high-resolution image by compositing the plurality of the texture layer low-resolution images and generating a base layer high-resolution image by compositing the plurality of the base layer low-resolution images; and outputting a high-resolution image by compositing the texture layer high-resolution image and the base layer high-resolution image.

The outputting of the high-resolution image may further include restoring high-frequency components of the high-resolution image.

The dividing of the low-resolution image may include obtaining the plurality of the texture layer low-resolution images and the plurality of the base layer low-resolution images by dividing the low-resolution image into a plurality of low-resolution images and dividing each of the plurality of low-resolution images into a texture layer low-resolution image and a base layer low-resolution image. The dividing of the low-resolution image may include generating the plurality of the base layer low-resolution images by applying a filter for at least one of preserving edge components and smoothing an image, to the low-resolution image; and generating difference images between the low-resolution image and the plurality of the base layer low-resolution images, as the plurality of the texture layer low-resolution images.

The generating of the texture layer high-resolution image and the base layer high-resolution image may include generating the texture layer high-resolution image by performing non-iterative filtering on the plurality of the texture layer low-resolution images; and generating the base layer high-resolution image by performing non-iterative filtering on the plurality of the base layer low-resolution images.

The generating of the texture layer high-resolution image and the base layer high-resolution image may include generating the texture layer high-resolution image by performing weighted sum filtering on a first current frame of each of the plurality of the texture layer low-resolution images, and at least one first temporally neighboring frame of the first current frame and at least one first spatially neighboring frame of the first current frame; and generating the base layer high-resolution image by performing weighted sum filtering on a second current frame of each of the plurality of the base layer low-resolution images, and at least one second temporally neighboring frame of the second current frame and at least one second spatially neighboring frame of the second current frame.

The outputting of the high-resolution image may include generating the high-resolution image by performing weighted average filtering on the texture layer high-resolution image and the base layer high-resolution image.

The restoring of the high-frequency components may include restoring the high-frequency components of the high-resolution image by performing non-iterative filtering on the high-resolution image.

According to another exemplary embodiment, there is provided an apparatus for reconstructing a high-resolution image by using multi-layer low-resolution images, the apparatus including a low-resolution image layer division unit for dividing a low-resolution image into a plurality of texture layer low-resolution images and a plurality of base layer low-resolution images; a texture layer high-resolution image generation unit for generating a texture layer high-resolution image by compositing the plurality of the texture layer low-resolution images; a base layer high-resolution image generation unit for generating a base layer high-resolution image by compositing the plurality of the base layer low-resolution images; and a high-resolution image composition unit for outputting a high-resolution image by compositing the texture layer high-resolution image and the base layer high-resolution image.

The high-resolution image composition unit may include a high-frequency component restoration unit for restoring high-frequency components of the high-resolution image.

The apparatus may further include a motion estimation unit for estimating motion information between a current frame of the low-resolution image and continuous neighboring frames of the current frame, the texture layer high-resolution image generation unit may generate the texture layer high-resolution image by performing weighted sum filtering on a first current frame of each of the plurality of the texture layer low-resolution images, and at least one first temporally neighboring frame of the first current frame and at least one first spatially neighboring frame of the first current frame, by using the neighboring frames motion-compensated based on the motion information, and the base layer high-resolution image generation unit may generate the base layer high-resolution image by performing weighted sum filtering on a second current frame of each of the plurality of the base layer low-resolution images, and at least one second temporally neighboring frame of the second current frame and at least one second spatially neighboring frame of the second current frame, by using neighboring frames motion-compensated based on the motion information.

The high-resolution image composition unit may generate the high-resolution image by performing weighted average filtering on the texture layer high-resolution image and the base layer high-resolution image.

The high-frequency component restoration unit may generate a high-resolution image by performing weighted sum filtering on at least one of the high-resolution image, a result of performing first filtering for restoring damaged high-frequency components of the high-resolution image, on the high-resolution image, and a result of performing second filtering for preventing noise amplification, on the high-resolution image.

At least one of the texture layer high-resolution image generation unit, the base layer high-resolution image generation unit and the high-resolution image composition unit may perform non-iterative weighted sum filtering on input images.

According to another exemplary embodiment, there is provided an apparatus for reconstructing a high-resolution image by using multi-layer low-resolution images, the apparatus including a low-resolution image multi-layer division unit for dividing an input low-resolution image into a plurality of individual layer low-resolution images with respect to each of a plurality of layers; an individual layer high-resolution image generation unit for generating an individual layer high-resolution image by compositing the plurality of the individual layer low-resolution images with respect to each of the plurality of the layers; and a multi-layer high-resolution image composition unit for outputting a high-resolution image by compositing a plurality of individual layer high-resolution images generated with respect to the plurality of layers.

According to another exemplary embodiment, there is provided a computer readable recording medium having recorded thereon a computer program for executing the above-described method.

According to yet another exemplary embodiment, there is provided a method of reconstructing a high-resolution image by using multi-layer low-resolution images, the method including: dividing a low-resolution image into at least one texture layer low-resolution image and at least one base layer low-resolution image; generating a texture layer high-resolution image based on the at least one texture layer low-resolution image; generating a base layer high-resolution image based on the at least one base layer low-resolution image; generating the high-resolution image based on the texture layer high-resolution image and the base layer high-resolution image.

According to still another exemplary embodiment, there is provided an apparatus for reconstructing a high-resolution image by using multi-layer low-resolution images, the apparatus including: a low-resolution image layer division unit for dividing a low-resolution image into at least one texture layer low-resolution and at least one base layer low-resolution image; a texture layer high-resolution image generation unit for generating a texture layer high-resolution image based on the at least one texture layer low-resolution image; a base layer high-resolution image generation unit for generating a base layer high-resolution image based on the at least one base layer low-resolution image; and a high-resolution image composition unit for generating the high-resolution image based on the texture layer high-resolution image and the base layer high-resolution image.

BRIEF DESCRIPTION OF THE DRAWINGS

The above and other features of exemplary embodiments will become more apparent by describing in detail exemplary embodiments thereof with reference to the attached drawings in which.

DETAILED DESCRIPTION OF EXEMPLARY EMBODIMENTS

Hereinafter, exemplary embodiments will be explained with reference to the attached drawings.

Figure 1:
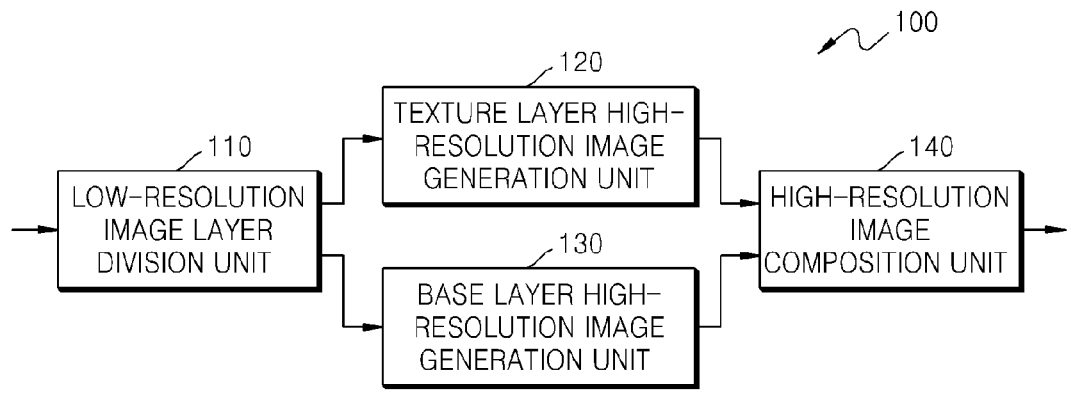
FIG. 1 is a block diagram of an apparatus for reconstructing a high-resolution image by using multi-layer low-resolution images, according to an exemplary embodiment.

FIG. 1 is a block diagram of an apparatus 100 for reconstructing a high-resolution image by using multi-layer low-resolution images, according to an exemplary embodiment.

Referring to FIG. 1, the high-resolution image reconstruction apparatus 100 includes a low-resolution image layer division unit 110, a texture layer high-resolution image generation unit 120, a base layer high-resolution image generation unit 130 and a high-resolution image composition unit 140.

The low-resolution image layer division unit 110 divides a low-resolution image input to the high-resolution image reconstruction apparatus 100 into a plurality of texture layer low-resolution images and a plurality of base layer low-resolution images.

Alternatively, the low-resolution image layer division unit 110 may separately divide each of a plurality of low-resolution images into a texture layer low-resolution image and a base layer image so as to generate a plurality of texture layer low-resolution images and a plurality of base layer low-resolution images.

The low-resolution image layer division unit 110 divides the low-resolution image into two layers, i.e., a texture layer and a base layer. Most simply, the texture layer and the base layer may be divided according to frequency characteristics of the low-resolution image and thus the low-resolution image may be divided into high-frequency components and low-frequency components.

Alternatively, the base layer may include low-frequency components and strong directional edge components of the low-resolution image. In this case, the texture layer may include high-frequency components representing detail information obtained by excluding the low-frequency components and the strong directional edge components from the low-resolution image.

That is, texture layer image components may be obtained by excluding base layer image components from an original image. Accordingly, the low-resolution image layer division unit 110 may extract the base layer low-resolution images from the low-resolution image and may obtain texture layer low-resolution images by excluding the base layer low-resolution images from the low-resolution image.

The low-resolution image layer division unit 110 may use a filter for preserving edge components and smoothing an image (hereinafter referred to as a edge-preserving smoothing filter) to extract base layer image components including low-frequency components and strong directional edge components from the low-resolution image. Accordingly, the low-resolution image layer division unit 110 may apply the edge-preserving smoothing filter to the low-resolution image so as to generate the base layer low-resolution images.

The low-resolution image input to the low-resolution image layer division unit 110 may be an image obtained by magnifying an original image. If a plurality of low-resolution images are used, the low-resolution images may be temporally or spatially continuous images.

The texture layer low-resolution images and the base layer low-resolution images divided by the low-resolution image layer division unit 110 are respectively output to the texture layer high-resolution image generation unit 120 and the base layer high-resolution image generation unit 130.

The texture layer high-resolution image generation unit 120 generates a texture layer high-resolution image by compositing the texture layer low-resolution images. Also, the base layer high-resolution image generation unit 130 generates a base layer high-resolution image by compositing the base layer low-resolution images.

The texture layer high-resolution image generation unit 120 or the base layer high-resolution image generation unit 130 may generate an individual layer high-resolution image by performing spatio-temporal weighted sum filtering on a plurality of individual layer low-resolution images.

In more detail, the texture layer high-resolution image generation unit 120 may generate the texture layer high-resolution image by performing weighted sum filtering on a current frame of each of the texture layer low-resolution images and temporally/spatially neighboring frames of the current frame. Also, the base layer high-resolution image generation unit 130 may generate the base layer high-resolution image by performing weighted sum filtering on a current frame of each of the texture layer low-resolution images and temporally/spatially neighboring frames of the current frame.

The texture layer high-resolution image generation unit 120 or the base layer high-resolution image generation unit 130 may perform weighted sum filtering on a current frame of each of the individual layer low-resolution images by using motion-estimated or motion-compensated temporal or spatially neighboring frames of the current frame.

The texture layer high-resolution image generation unit 120 or the base layer high-resolution image generation unit 130 may consider at least one of spatial proximity, temporal proximity, luminance differences, proximity to a strong edge and reliability of motion estimation of neighboring frames with respect to a current frame in an individual layer, in order to determine a weight used to perform weighted sum filtering.

Examples of the spatial proximity include a spatial distance between a current region of a current frame and a reference region of a neighboring frame, and a distance between center pixel positions. Also, examples of the temporal proximity include a time difference and a frame index difference between a current frame and a neighboring frame.

The texture layer high-resolution image generation unit 120 or the base layer high-resolution image generation unit 130 may generate the individual layer high-resolution images by performing spatio-temporal weighted sum filtering on a plurality of continuous individual layer low-resolution images by using a weight based on spatio-temporal proximity or similarity between a current frame and neighboring frames.

Examples of the similarity may include various values such as differences between pixel values and luminance values of pixels.

Also, since filtering is performed by using a plurality of continuous individual layer low-resolution images, the texture layer high-resolution image generation unit 120 or the base layer high-resolution image generation unit 130 may generate the individual layer high-resolution image by performing non-iterative filtering.

The high-resolution image composition unit 140 composites the texture layer high-resolution image and the base layer high-resolution image and outputs a high-resolution image. The high-resolution image composition unit 140 may generate the high-resolution image by performing weighted average filtering on the texture layer high-resolution image and the base layer high-resolution image.

The high-resolution image composition unit 140 may perform weighted average filtering by minimizing damages of texture layer image components of an original image and considering an edge direction of the original image. Accordingly, the high-resolution image composition unit 140 may apply a first weight for minimizing damage of texture layer image components of an original image, to the texture layer high-resolution image, and may apply a second weight for smoothing the original image in consideration of an edge direction of the original image, to the base layer high-resolution image.

The high-resolution image composition unit 140 may generate the high-resolution image by restoring high-frequency components of an initial high-resolution image generated by performing weighted average filtering on the texture layer high-resolution image and the base layer high-resolution image.

In order to restore the high-frequency components of the initial high-resolution image, the high-resolution image composition unit 140 may perform first filtering for restoring the high-frequency components of the initial high-resolution image and second filtering for preventing noise amplification. The high-resolution image composition unit 140 may generate the high-resolution image by performing weighted sum filtering on the initial high-resolution image, a result of performing first filtering on the initial high-resolution image, and a result of performing second filtering on the initial high-resolution image.

The high-resolution image composition unit 140 may generate the high-resolution image, in which the initial high-resolution image and the high-frequency components are restored, by performing non-iterative weighted sum filtering on the texture layer high-resolution image and the base layer high-resolution image.

Accordingly, the high-resolution image reconstruction apparatus 100 generates a high-resolution image by dividing a low-resolution image into two or more layers, generating a plurality of individual layer low-resolution images, and compositing the individual layer low-resolution images, and thus follows a non-iterative calculation method.

In general, existing high-resolution image reconstruction technologies using a low-resolution image follow an iterative calculation method. In this case, calculation is repeated to obtain an optimal result and thus the amount of calculation is large. On the other hand, the high-resolution image reconstruction apparatus 100 requires a smaller amount of calculation due to a non-iterative calculation method.

Also, when a individual layer high-resolution image is generated by performing weighted sum filtering on a plurality of individual layer low-resolution images, since a weight is determined in consideration of temporal proximity, spatial proximity, luminance differences, reliability of motion estimation or the like between the individual layer low-resolution images, weighted sum filtering based on neighboring data of a current pixel is enabled.

As such, the high-resolution image reconstruction apparatus 100 may generate a visually natural high-resolution image by preventing damage of texture layer image components, in which correlations between a current pixel and neighboring data are small, and by preventing noise amplification in consideration of an edge direction.

Figure 2:
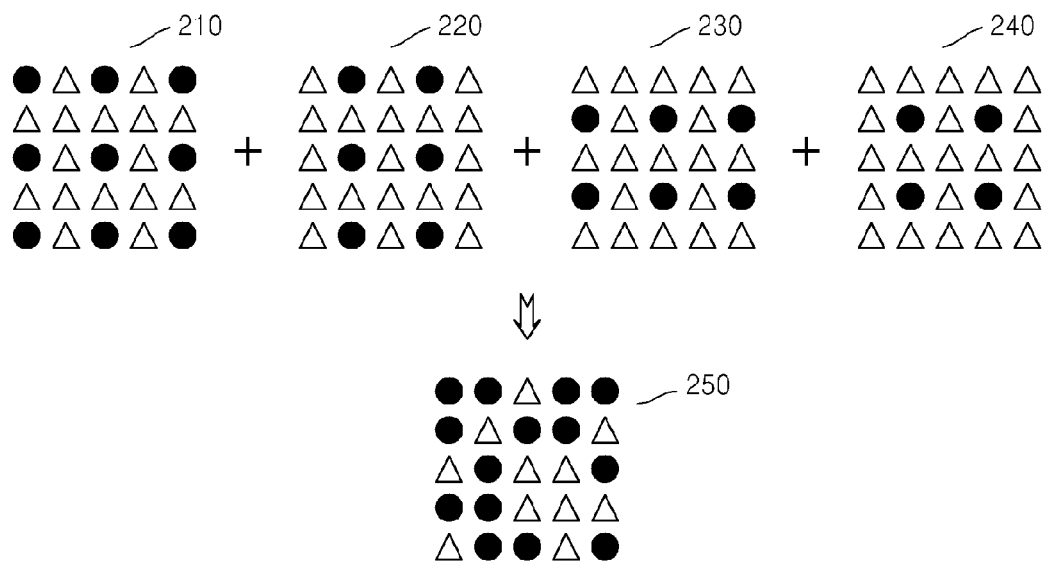
FIG. 2 is a schematic diagram for describing a method of generating a high-resolution image by compositing a plurality of magnified low-resolution images, according to a related art.

FIG. 2 is a schematic diagram for describing a method of generating a high-resolution image 250 by compositing a plurality of magnified low-resolution images 210, 220, 230 and 240, according to a related art.

The method of FIG. 2 is an example of a method of generating a high-resolution image by compositing a plurality of low-resolution images. In particular, a method of generating one high-resolution image by compositing low-resolution images magnified twice in width and height will be described. Referring to FIG. 2, in the low-resolution images 210, 220, 230 and 240, a block circle represents a sample pixel that is not interpolated and a white triangle represents an empty pixel that is interpolated or to which a pixel value is not allocated.

Ideally, in order to generate a high-resolution image by compositing low-resolution images magnified twice in width and height, four low-resolution images 210, 220, 230 and 240 magnified twice in width and height are required. The four magnified low-resolution images 210, 220, 230 and 240 may be composited to generate the high-resolution image 250.

However, if the number of valid pixels is not sufficient, if a mismatch occurs, or if valid pixels are unevenly distributed, distortion such as aliasing, jagging artifacts or flickering artifacts may occur in the high-resolution image 250.

Accordingly, in order to prevent distortion of the high-resolution image 250, while the low-resolution images 210, 220, 230 and 240 are composited, the high-resolution image 250 has to be reconstructed by filtering or sampling a current pixel by using neighboring data.

Technologies of reconstructing a high-resolution image by using a low-resolution image will now be described with reference to FIGS. 3 and 4.

Figure 3:
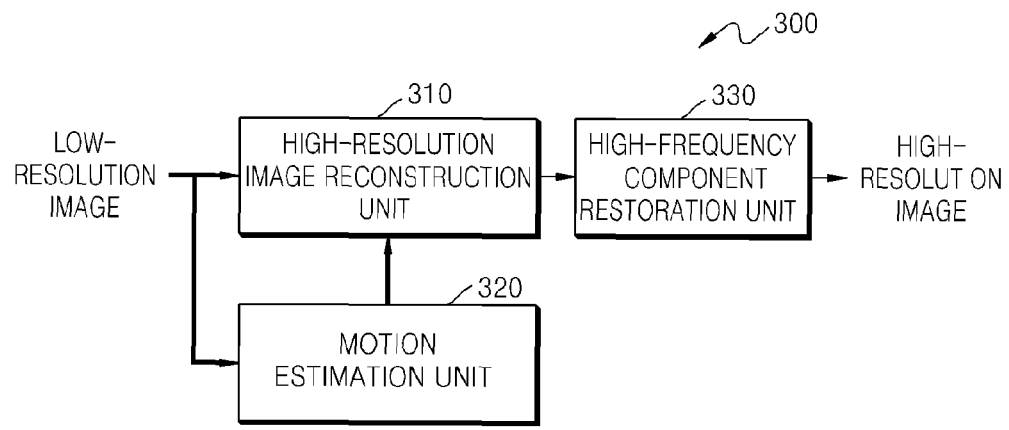
FIG. 3 is a block diagram of an apparatus for reconstructing a high-resolution image by using a low-resolution image, according to a related art.

FIG. 3 is a block diagram of an apparatus 300 for reconstructing a high-resolution image by using a low-resolution image, according to a related art.

Referring to FIG. 3, in the high-resolution image reconstruction apparatus 300, a motion estimation unit 320 obtains motion information regarding an input low-resolution image, and a high-resolution image reconstruction unit 310 reconstructs a high-resolution image of the input low-resolution image by using neighboring data motion-compensated by using the motion information of the motion estimation unit 320. A high-frequency component restoration unit 330 restores high-frequency components of the high-resolution image by deblurring the high-resolution image output from the high-resolution image reconstruction unit 310 and outputs the high-resolution image.

The high-resolution image reconstruction unit 310 performs linear filtering or non-linear filtering on a plurality of low-resolution images in order to reconstruct the high-resolution image. In this case, a pixel of a smooth region or an edge region, in which correlations between a current pixel and neighboring pixels are high, may be restored into a highly reliable prediction value with reference to neighboring data. However, image data of a pixel of a texture layer image component, in which correlations with neighboring pixels are low, may be damaged by neighboring data.

Figure 4:
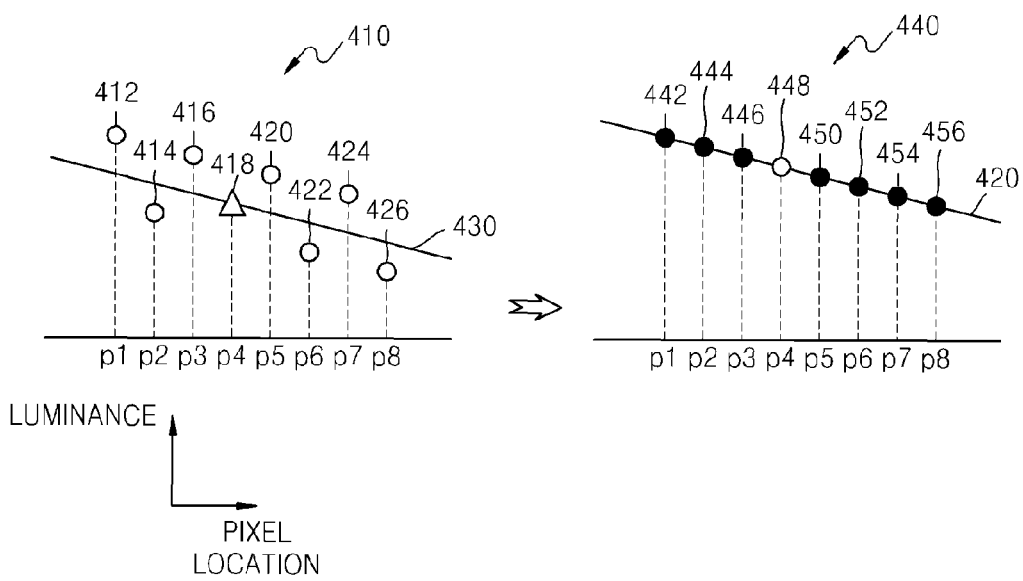
FIG. 4 illustrates graphs for describing a method of reconstructing a high-resolution image by using a low-resolution image in a high-resolution image reconstruction apparatus, according to a related art.

FIG. 4 illustrates graphs 410 and 440 for describing a method of reconstructing a high-resolution image by using a low-resolution image in a high-resolution image reconstruction apparatus, according to a related art. The high-resolution image reconstruction unit 310 of the high-resolution image reconstruction apparatus 300 illustrated in FIG. 3 follows the high-resolution image reconstruction method of FIG. 4.

Referring to FIG. 4, the graphs 410 and 440 respectively show luminance values of pixels p1, p2, p3, p4, p5, p6, p7 and p8 in a first high-resolution image generated by compositing low-resolution images and a second high-resolution image reconstructed by performing linear filtering or non-linear filtering.

In the graph 410 of the first high-resolution image, luminance values 412, 414, 416, 420, 422, 424 and 426 of the pixels p1, p2, p3, p4, p5, p6, p7 and p8 are luminance values of composited sample pixels of the low-resolution images. However, although the low-resolution images are composited, due to insufficient data or uneven pixel distribution, the luminance value of the pixel p4 may not be determined and thus an empty space 418 may occur.

In the graph 440 of the second high-resolution image, a reconstructed pixel value 448 may be determined with respect to the empty space 418 of the pixel p4 in the first high-resolution image due to interpolation performed by using at least one of the luminance values 412, 414, 416, 420, 422, 424, and 426 of the neighboring pixels p1, p2, p3, p5, p6, p7 and p8. The luminance values 412, 414, 416, 418, 420, 422, 424 and 426 of all pixels, i.e., the pixel p4 and the neighboring pixels p1, p2, p3, p5, p6, p7 and p8, are reconstructed due to interpolation filtering performed in order to reconstruct a high-resolution image, and thus are changed into luminance values 442, 444, 446, 448, 450, 452, 454 and 456.

If a current pixel is restored with reference to neighboring pixels in a smooth region or an edge region, in which correlations with neighboring pixels are high, the reliability of interpolation filtering using luminance values of the neighboring pixels may be high. However, if interpolation filtering is performed with reference to neighboring pixels in a texture layer image component region, in which correlations with neighboring pixels are low, a texture layer image component may be damaged.

For example, the luminance values 412, 414, 416, 420, 422, 424 and 426 of the pixels p1, p2, p3, p4, p5, p6, p7 and p8 in the first high-resolution image are distributed with detail information with respect to a slope 430 and correlations between detail information of the pixels p1, p2, p3, p4, p5, p6, p7 and p8 are low. However, the luminance values 442, 444, 446, 448, 450, 452, 454 and 456 of the pixels p1, p2, p3, p4, p5, p6, p7 and p8 in the second high-resolution image may be distributed along a slope 420 as detail information having low correlations are lost due to interpolation filtering.

Accordingly, as the high-resolution image reconstruction unit 310 reconstructs a high-resolution image by performing linear filtering or non-linear filtering, detail information and image texture related to texture layer image components may be damaged in the high-resolution image.

Although the high-frequency component restoration unit 330 of the high-resolution image reconstruction apparatus 300 restores high-frequency components of a reconstructed high-resolution image, the high-frequency components that are already damaged or lost when the high-resolution image reconstruction unit 310 magnifies low-resolution images or reconstructs a high-resolution image may not be easily restored.

Figure 5:
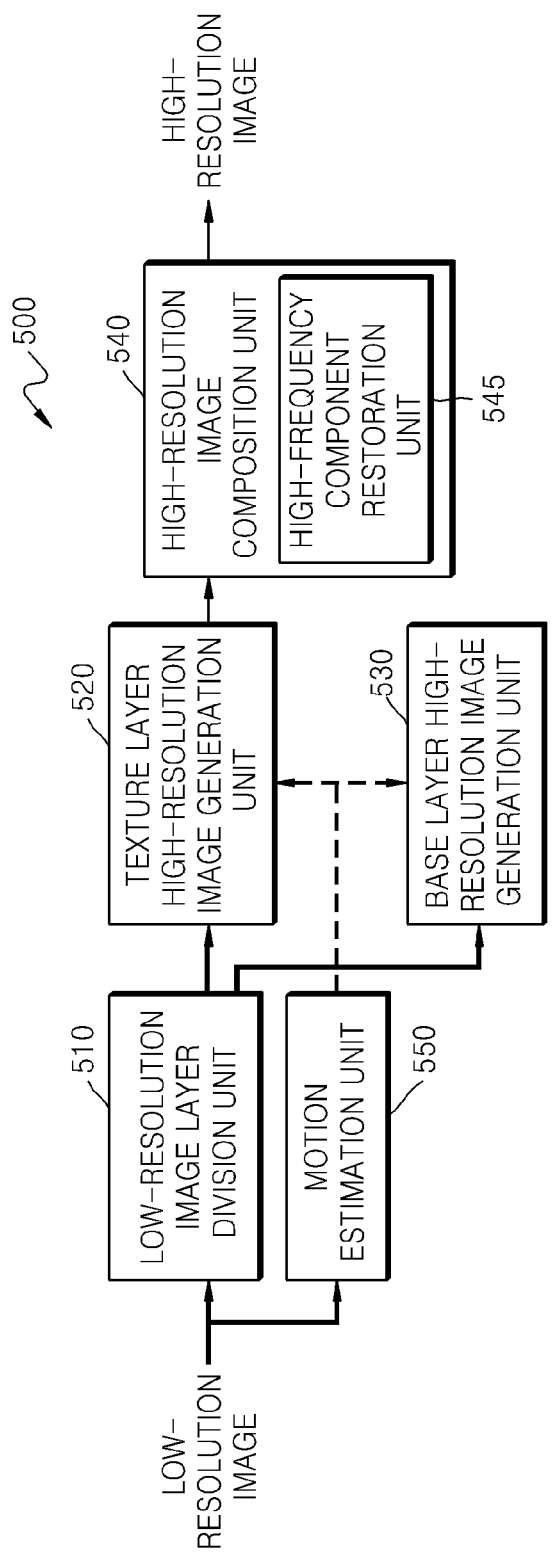
FIG. 5 is a block diagram of an example of an apparatus for reconstructing a high-resolution image by using multi-layer low-resolution images, according to an exemplary embodiment.

FIG. 5 is a block diagram of an example of an apparatus 500 for reconstructing a high-resolution image by using multi-layer low-resolution images, according to an exemplary embodiment.

The high-resolution image reconstruction apparatus 500 is an example of the high-resolution image reconstruction apparatus 100 illustrated in FIG. 1.

Referring to FIG. 5, the high-resolution image reconstruction apparatus 500 includes a low-resolution image layer division unit 510, a texture layer high-resolution image generation unit 520, a base layer high-resolution image generation unit 530, a high-resolution image composition unit 540 and a motion estimation unit 550. Also, the high-resolution image composition unit 540 includes a high-frequency component restoration unit 545.

In the high-resolution image reconstruction apparatus 500, before low-resolution images are composited to reconstruct a high-resolution image, the low-resolution image layer division unit 510 divide frames of the low-resolution image into base layer low-resolution image frames and texture layer low-resolution image frames.

The texture layer high-resolution image generation unit 520 generates a texture layer high-resolution image frame by compositing the texture layer low-resolution image frames and the base layer high-resolution image generation unit 530 generates a base layer high-resolution image frame by compositing the base layer low-resolution image frames.

In the high-resolution image reconstruction apparatus 500, the motion estimation unit 550 obtains motion information of neighboring frames with respect to a current frame of magnified low-resolution images. The texture layer high-resolution image generation unit 520 or the base layer high-resolution image generation unit 530 may reconstruct an individual layer high-resolution image that is temporally/spatially adaptive to a current frame of individual layer low-resolution images, by using prediction information or the motion information obtained by the motion estimation unit 550.

Also, in consideration of at least one of temporal proximity, spatial proximity, reliability of motion estimation and luminance similarity between the current frame and the neighboring frames, a reconstructed individual layer high-resolution image may be generated based on information regarding temporal or spatially neighboring frames of the current frame of each of the individual layer low-resolution images.

The high-resolution image composition unit 540 may composite the texture layer high-resolution image and the base layer high-resolution image respectively generated by the texture layer high-resolution image generation unit 520 and the base layer high-resolution image generation unit 530 so as to generate an initial high-resolution image. The initial high-resolution image may be generated by performing weighted average filtering on the texture layer high-resolution image and the base layer high-resolution image.

Also, the high-frequency component restoration unit 545 of the high-resolution image composition unit 540 may restore high-frequency components of the initial high-resolution image. The high-frequency component restoration unit 545 may use filters having different filter characteristics in order to restore the high-frequency components by minimizing noise amplification in the initial high-resolution image. For example, a bilateral filter for minimizing amplification of image noise and a bandpass filter for restoring high-frequency components may be used together.

As such, the high-resolution image reconstruction apparatus 500 may generate a high-resolution image, in which texture layer image components are preserved and noise is not amplified, by processing low-resolution images with respect to individual layers.

Figure 6:
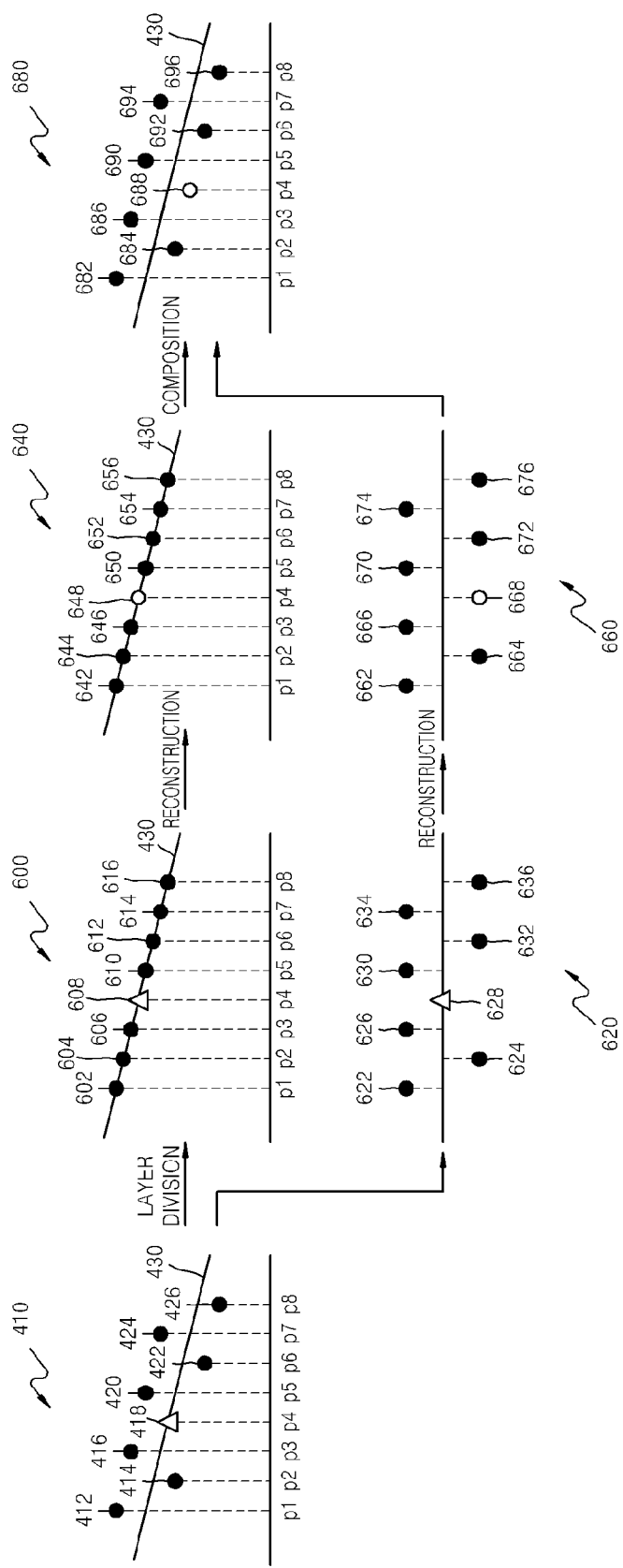
FIG. 6 illustrates graphs for describing a method of reconstructing a high-resolution image by using multi-layer low-resolution images in a high-resolution image reconstruction apparatus, according to an exemplary embodiment.

FIG. 6 illustrates graphs 410, 600, 620, 640, 660 and 680 for describing a method of reconstructing a high-resolution image by using multi-layer low-resolution images in a high-resolution image reconstruction apparatus, according to an exemplary embodiment.

The texture layer high-resolution image generation unit 120 or 520, the base layer high-resolution image generation unit 130 or 530, and the high-resolution image composition unit 140 or 540 of the high-resolution image reconstruction apparatus 100 or 500 illustrated in FIG. 1 or 5 may follow the high-resolution image reconstruction method of FIG. 6.

The graph 410 shows luminance values of pixels of a first high-resolution image generated by compositing low-resolution images. The high-resolution image reconstruction apparatus 100 or 500 divides a low-resolution image into a plurality of texture layer low-resolution images and a plurality of base layer low-resolution images. The base layer high-resolution image generation unit 130 or 530 generates an initial base layer high-resolution image corresponding to the graph 600 by compositing the base layer low-resolution images and the texture layer high-resolution image generation unit 120 or 520 generates an initial texture layer high-resolution image corresponding to the graph 620 by compositing the texture layer low-resolution images.

The initial base layer high-resolution image of the graph 600 includes base layer image components from which texture layer image components are excluded and luminance values 602, 604, 606, 610, 612, 614 and 616 of pixels p1, p2, p3, p5, p6, p7 and p8 may be arranged along a predetermined slope 430. The initial base layer high-resolution image may have an empty space 608 in the pixel p4.

The initial texture layer high-resolution image of the graph 620 includes the texture layer image components and luminance values 622, 624, 626, 630, 632, 634 and 636 of the pixels p1, p2, p3, p5, p6, p7 and p8 have small correlations between neighboring pixels. The initial texture layer high-resolution image may have an empty space 628 in the pixel 4.

The base layer high-resolution image generation unit 130 or 530 may compensate for the empty space 608 of the pixel p4 in the initial base layer high-resolution image in order to reconstruct a base layer high-resolution image. The base layer high-resolution image generation unit 130 or 530 may determine a reconstructed luminance value 648 with respect to the empty space 608 of the pixel p4 in consideration of temporal proximity, spatial proximity, luminance distances, reliability of prediction or the like between neighboring pixels.

Likewise, the pixels p1, p2, p3, p5, p6, p7 and p8 of the base layer high-resolution image may be reconstructed to have luminance values 642, 644, 646, 650, 652, 654, 656 in consideration of correlations with neighboring pixels. Accordingly, luminance distribution of the pixels p1, p2, p3, p4, p5, p6, p7 and p8 of the base layer high-resolution image reconstructed from the composited base layer low-resolution images by the base layer high-resolution image generation unit 130 or 530 follows the graph 640.

The texture layer high-resolution image generation unit 120 or 520 may compensate for the empty space 628 of the pixel p4 in the initial texture layer high-resolution image in order to reconstruct a texture layer high-resolution image. The texture layer high-resolution image generation unit 120 or 520 may allocate a reconstructed luminance value 668 with respect to the empty space 628 of the pixel p4 in consideration of temporal proximity and similarity, spatial proximity and similarity, luminance distances, reliability of prediction or the like between neighboring pixels.

Likewise, the pixels p1, p2, p3, p5, p6, p7 and p8 of the texture layer high-resolution image may be reconstructed to have luminance values 662, 664, 666, 670, 672, 674 and 676 in consideration of correlations with neighboring pixels. Accordingly, luminance distribution of the pixels p1, p2, p3, p4, p5, p6, p7 and p8 of the texture layer high-resolution image reconstructed from the composited base layer low-resolution images by the texture layer high-resolution image generation unit 120 or 520 follows the graph 660.

The high-resolution image composition unit 140 or 540 composites the texture layer high-resolution image generated by the texture layer high-resolution image generation unit 120 or 520 and the base layer high-resolution image generated by the base layer high-resolution image generation unit 130 or 530 so as to ultimately generate a high-resolution image. The pixels p1, p2, p3, p4, p5, p6, p7 and p8 of the high-resolution image generated by the high-resolution image composition unit 140 or 540 may have luminance values 682, 684, 686, 688, 690, 692, 694 and 696 of the graph 680. According to the graph 680, in the high-resolution image, a pixel of an empty space is compensated and detail information is preserved with respect to a slope 430.

Figure 7:
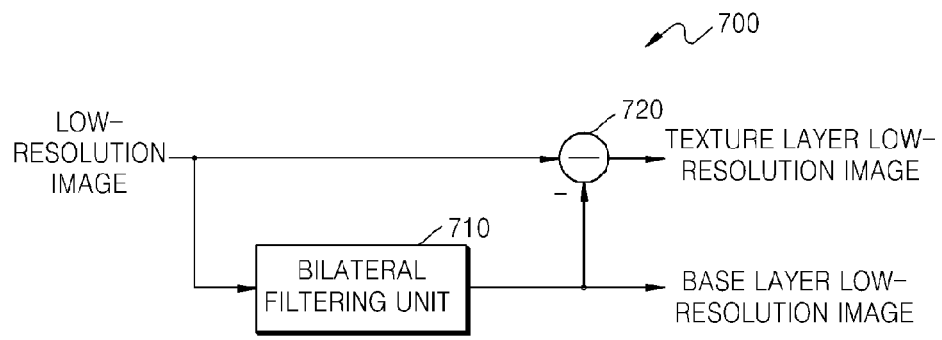
FIG. 7 is a block diagram of an example of a low-resolution image layer division unit of a high-resolution image reconstruction apparatus, according to an exemplary embodiment.

FIG. 7 is a block diagram of an example of a low-resolution image layer division unit 700 of a high-resolution image reconstruction apparatus, according to an exemplary embodiment.

The low-resolution image layer division unit 700 may be an example of the low-resolution image layer division unit 110 or 510 of the high-resolution image reconstruction apparatus 100 or 500 illustrated in FIG. 1 or 5.

Referring FIG. 7, a low-resolution image input to the low-resolution image layer division unit 700 may be obtained by magnifying an original image. The original image may be magnified by using various interpolation methods such as bilinear interpolation, bicubic interpolation and Lanczos interpolation methods.

The low-resolution image layer division unit 700 may use a bilateral filter to divide the low-resolution image into base and texture layer image components. The bilateral filter is an edge-preserving smoothing filter and may preserve a strong edge region and may extract a base layer image including low-frequency components, from an input image. The low-resolution image layer division unit 700 may include a bilateral filtering unit 710 and a subtractor 720.

When a low-resolution image is input to the low-resolution image layer division unit 700, the bilateral filtering unit 710 may generate a base layer low-resolution image from the input low-resolution image and output the base layer low-resolution image, and the subtractor 720 may subtract the base layer low-resolution image from the low-resolution image and outputs a texture layer low-resolution image.

The low-resolution image layer division unit 700 is only an example of the low-resolution image layer division unit 110 or 510, and layer division of a low-resolution image is not limited to a bilateral filter and may also be performed by using various methods used in the art to extract texture layer image components from an image.

Figure 8:
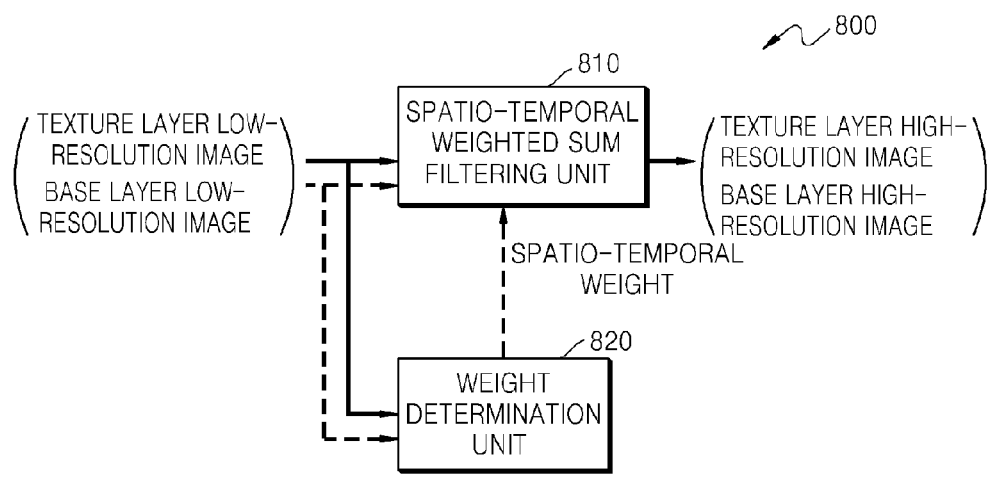
FIG. 8 is a block diagram of an example of a texture layer high-resolution image generation unit or a base layer high-resolution image generation unit of a high-resolution image reconstruction apparatus, according to an exemplary embodiment.

FIG. 8 is a block diagram of an example of a texture layer high-resolution image generation unit or a base layer high-resolution image generation unit of a high-resolution image reconstruction apparatus, according to an exemplary embodiment.

For convenience of explanation, the texture layer high-resolution image generation unit or the base layer high-resolution image generation unit is referred to as 'an individual layer high-resolution image generation unit 800'. The individual layer high-resolution image generation unit 800 is an example of the texture layer high-resolution generation unit 120 or 520, or the base layer high-resolution generation unit 130 or 530 of the high-resolution image reconstruction apparatus 100 or 500 illustrated in FIG. 1 or 5.

The individual layer high-resolution image generation unit 800 includes a spatio-temporal weighted sum filtering unit 810 and a weight determination unit 820. The spatio-temporal weighted sum filtering unit 810 obtains a weight used to perform weighted sum filtering from the weight determination unit 820. The spatio-temporal weighted sum filtering unit 810 and the weight determination unit 820 may use motion information between a current pixel and neighboring data of the current pixel in order to reconstruct a high-resolution image based on the neighboring data of the current pixel.

The texture layer high-resolution generation unit 120 or 520, and the base layer high-resolution generation unit 130 or 530 may include the same elements as the spatio-temporal weighted sum filtering unit 810 and the weight determination unit 820 of the predetermined layer high-resolution image generation unit 800. However, since an input image and a weight used to perform spatio-temporal weighted sum filtering are different with respect to individual layers, a texture layer high-resolution image and a base layer high-resolution image may be separately output as resultant images.

In more detail, when a texture layer low-resolution image is input to the individual layer high-resolution image generation unit 800, the spatio-temporal weighted sum filtering unit 810 performs weighted sum filtering on a current frame of the texture layer low-resolution image and temporally/spatially neighboring frames of the current frame. The weight determination unit 820 determines spatio-temporal weights of continuous frames of the texture layer low-resolution image in consideration of motion information and temporal proximity of temporally neighboring frames of the current frame, spatial proximity of spatially neighboring frames of the current frame, and reliability of prediction information. The spatio-temporal weighted sum filtering unit 810 may perform weighted sum filtering on a current frame of the texture layer low-resolution image and temporally/spatially neighboring frames of the current frame by using the spatio-temporal weights determined by the weight determination unit 820 and may output a texture layer high-resolution image.

Likewise, when a base layer low-resolution image is input to the predetermined layer high-resolution image generation unit 800, the spatio-temporal weighted sum filtering unit 810 performs weighted sum filtering on a current frame of the base layer low-resolution image and temporally/spatially neighboring frames of the current frame. The weight determination unit 820 determines spatio-temporal weights of continuous frames of the base layer low-resolution image in consideration of motion information and temporal proximity of temporally neighboring frames of the current frame, spatial proximity of spatially neighboring frames of the current frame, and reliability of prediction information. The spatio-temporal weighted sum filtering unit 810 may perform weighted sum filtering on a current frame of the base layer low-resolution image and temporally/spatially neighboring frames of the current frame by using the spatio-temporal weights determined by the weight determination unit 820 and may output a base layer high-resolution image.

Although the predetermined layer high-resolution image generation unit 800 reconstructs individual layer high-resolution images by performing weighted sum filtering using spatio-temporal weights in consideration of proximity and similarity with temporally/spatially neighboring data with respect to both texture and base layers, methods of determining weights used to perform weighted sum filtering are different with respect to texture layer and base layer low-resolution images.

For example, the weight determination unit 820 may use a sum of absolute differences (SAD) between a current block and neighboring blocks, spatial distances from a center pixel, temporal distances from neighboring frames, distances in a strong edge direction and luminance distances from the center pixel, as parameters for determining weights of frames.

Texture layer image components have low spatial correlations to each other and thus spatial characteristics of the texture layer image components need to be preserved. In order to determine a weight used to reconstruct the texture layer high-resolution image, the weight determination unit 820 may reduce a weight obtained based on spatial distances from a center pixel, distances in a strong edge direction and luminance distances from the center pixel.

When the base layer high-resolution image is reconstructed, edges have to be preserved and thus smoothing needs to be performed in consideration of an edge direction. Accordingly, in order to determine a weight used to reconstruct the base layer high-resolution image, the weight determination unit 820 may increase a weight obtained based on distances in a strong edge direction.

As such, the predetermined layer high-resolution image generation unit 800 generates an individual layer high-resolution image by performing weighted sum filtering on a plurality of individual layer low-resolution images and thus a high-resolution image may be reconstructed from low-resolution images by using a non-iterative calculation method.

The texture layer high-resolution image and the base layer high-resolution image output from the predetermined layer high-resolution image generation unit 800 may be composited into one initial high-resolution image by the high-resolution image composition unit 140 or 540 of the high-resolution image reconstruction apparatus 100 or 500.

The high-resolution image composition unit 140 or 540 may generate the initial high-resolution image by performing weighted average filtering on the texture layer high-resolution image and the base layer high-resolution image. Weights used to perform weighted average filtering on the texture layer high-resolution image and the base layer high-resolution image may be determined according to which of texture layer image components and base layer image components are to be enhanced.

The high-frequency component restoration unit 545 of the high-resolution image composition unit 540 may restore high-frequency components of the initial high-resolution image generated by performing weighted average filtering on the texture layer high-resolution image and the base layer high-resolution image.

Figure 9:
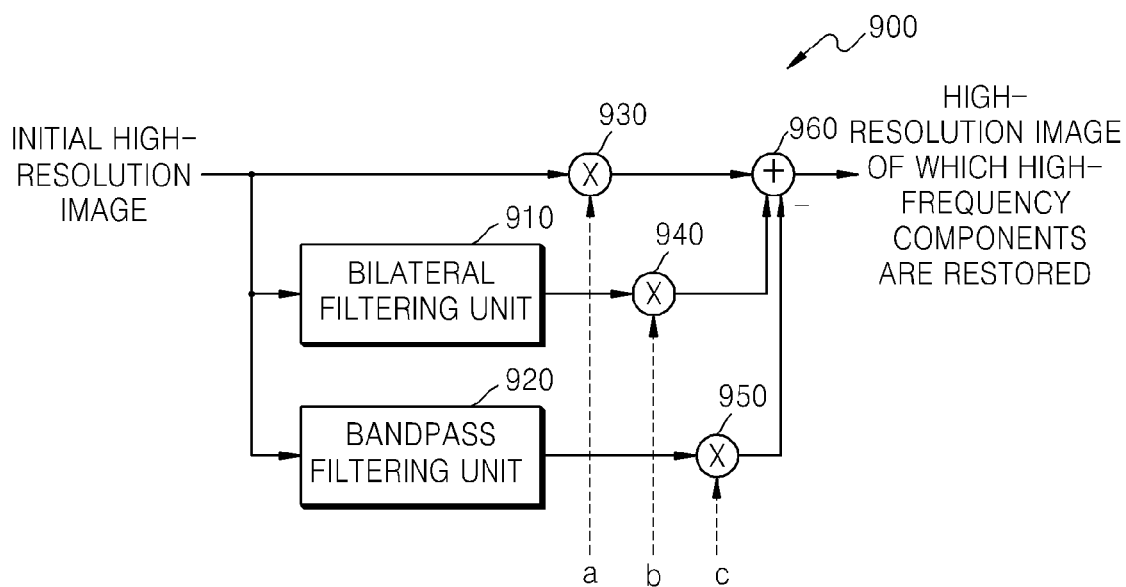
FIG. 9 is a block diagram of an example of a high-frequency component restoration unit of a high-resolution image composition unit of a high-resolution image reconstruction apparatus, according to an exemplary embodiment.

FIG. 9 is a block diagram of an example of a high-frequency component restoration unit 900 of a high-resolution image composition unit of a high-resolution image reconstruction apparatus, according to an exemplary embodiment.

The high-frequency component restoration unit 900 is an example of the high-frequency component restoration unit 545 of the high-resolution image composition unit 540 of the high-resolution image reconstruction apparatus 500 illustrated in FIG. 5.

Referring to FIG. 9, the high-frequency component restoration unit 900 includes a bilateral filtering unit 910, a bandpass filtering unit 920, multipliers 930, 940 and 950, and an adder 960. The high-frequency component restoration unit 900 may use at least one bandpass filter that operates according to individual frequency bands, as a filter to restore damaged high-frequency components of an initial high-resolution image. Also, the high-frequency component restoration unit 900 may use at least one bilateral filter that operates according to characteristics of individual frequency bands, as a filter for preventing noise amplification.

The bilateral filtering unit 910 may include a group of a plurality of bilateral filters that operate according to different band characteristics of frequency bands. Also, in order to restore high-frequency components in frequency bands, the bandpass filtering unit 920 may include a group of a plurality of bandpass filters that operate according to different frequency bands.

The high-frequency component restoration unit 900 may generate a high-resolution image of which high-frequency components are restored, by performing weighted sum filtering on the initial high-resolution image, a resultant image of the bilateral filtering unit 910, and a resultant image of the bandpass filtering unit 920. Weights a, b and c of the initial high-resolution image, the resultant image of the bilateral filtering unit 910, and the resultant image of the bandpass filtering unit 920 may be determined according to which image components are to be enhanced.

The multipliers 930, 940 and 950 respectively multiply the initial high-resolution image, the resultant image of the bilateral filtering unit 910, and the resultant image of the bandpass filtering unit 920 by the weights a, b and c, and resultant values are calculated by the adder 960. In the adder 960, as subtraction is performed on the resultant values of the bandpass filtering unit 920, high-frequency components excluding image components passed through a corresponding frequency band may be restored.

The high-frequency component restoration unit 900 may perform weighted sum filtering on the initial high-resolution image, the resultant image of the bilateral filtering unit 910, and the resultant image of the bandpass filtering unit 920 by using a non-iterative calculation method so as to restore the high-frequency components of the high-resolution image, and thus a high-resolution image in which noise amplification is prevented and high-frequency components are restored may be output.

The high-frequency component restoration unit 900 is only an example of the high-frequency component restoration unit 545, and noise amplification prevention and high-frequency component restoration are not limited to a bilateral filter and a bandpass filter, and may also be performed by using various methods used in the art for the same purpose.

Figure 10:
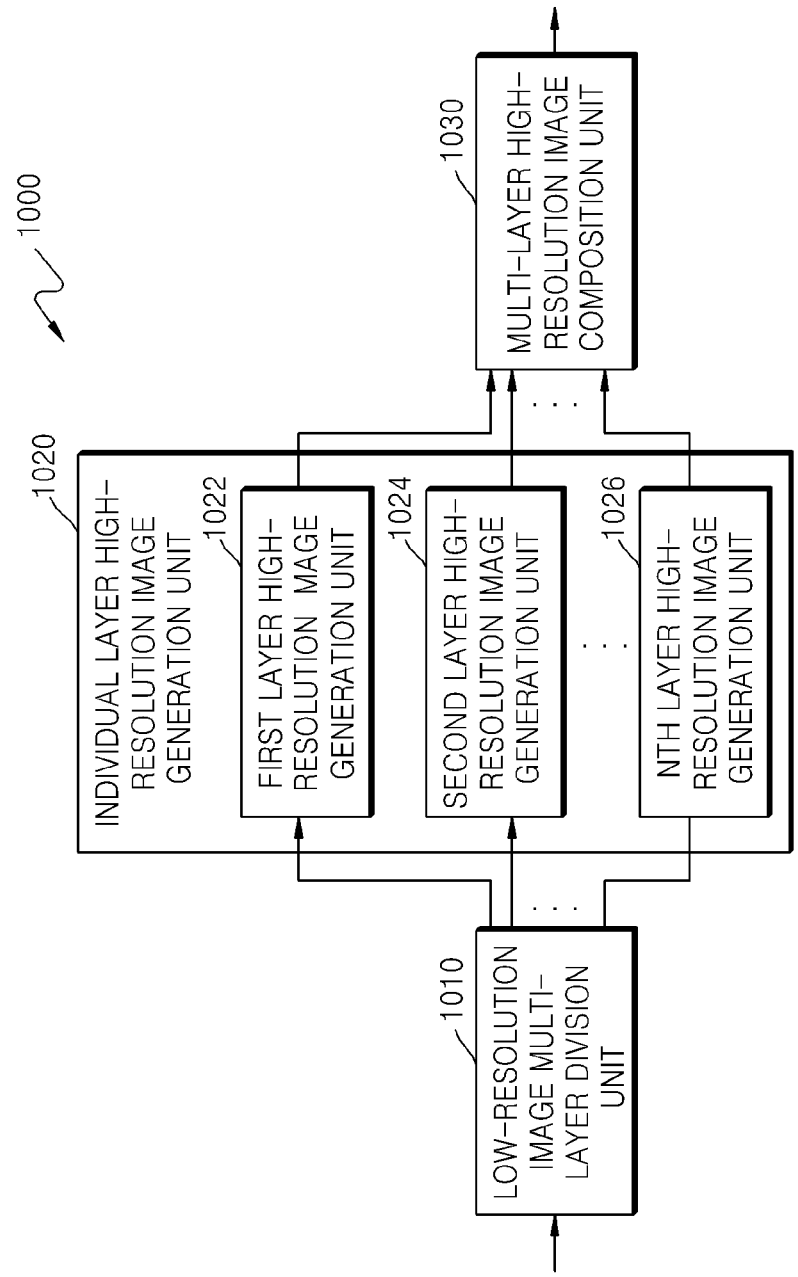
FIG. 10 is a block diagram of an apparatus for reconstructing a high-resolution image by using multi-layer low-resolution images, according to another exemplary embodiment.

FIG. 10 is a block diagram of an apparatus 1000 for reconstructing a high-resolution image by using multi-layer low-resolution images, according to another exemplary embodiment.

Referring to FIG. 10, the high-resolution image reconstruction apparatus 1000 includes a low-resolution image multi-layer division unit 1010, an individual layer high-resolution image generation unit 1020 and a multi-layer high-resolution image composition unit 1030.

The low-resolution image multi-layer division unit 1010 divides a low-resolution image input to the high-resolution image reconstruction apparatus 1000 into individual layer low-resolution images with respect to each layer. The low-resolution image multi-layer division unit 1010 may divide at least one low-resolution image into a plurality of individual layer low-resolution images with respect to each layer.

The low-resolution image multi-layer division unit 1010 outputs the divided individual layer low-resolution images to the individual layer high-resolution image generation unit 1020.

The individual layer high-resolution image generation unit 1020 allocates the individual layer low-resolution images input from the low-resolution image multi-layer division unit 1010, to a first layer high-resolution image generation unit 1022, a second layer high-resolution image generation unit 1024 and an Nth layer high-resolution image generation unit 1026. The individual layer high-resolution image generation unit 1020 generates an individual layer high-resolution image by compositing the individual layer low-resolution images with respect to each layer.

In more detail, the first layer high-resolution image generation unit 1022 generates a first layer high-resolution image, the second layer high-resolution image generation unit 1024 generates a second layer high-resolution image, and the Nth layer high-resolution image generation unit 1026 generates an Nth layer high-resolution image.

As such, the individual layer high-resolution image generation unit 1020 generates individual layer high-resolution images with respect to a plurality of individual layers and outputs the generated individual layer high-resolution images to the multi-layer high-resolution image composition unit 1030.

The multi-layer high-resolution image composition unit 1030 composites the input individual layer high-resolution images and outputs a high-resolution image. The multi-layer high-resolution image composition unit 1030 may determine weights of the individual layer high-resolution images in consideration of characteristics of the individual layers. The multi-layer high-resolution image composition unit 1030 may generate the high-resolution image by performing weighted average filtering on the individual layer high-resolution images based on the weights. The multi-layer high-resolution image composition unit 1030 may minimize noise of the high-resolution image and amplify high-frequency components in order to restore the high-frequency components of the generated high-resolution image.

Figure 11:
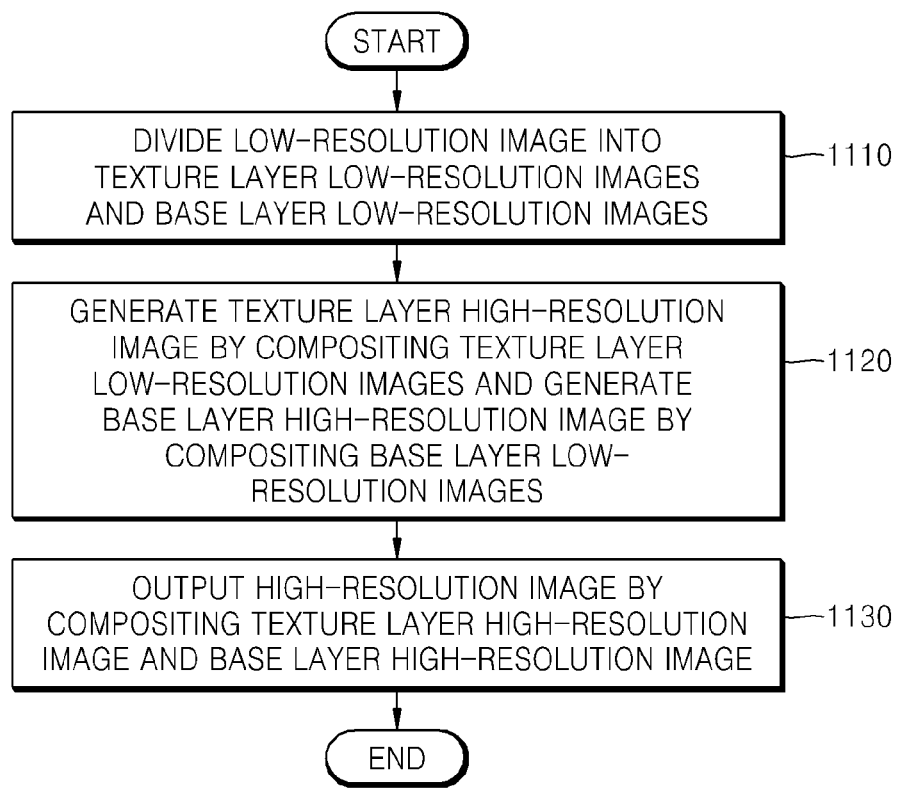
FIG. 11 is a flowchart of a method of reconstructing a high-resolution image by using multi-layer low-resolution images, according to an exemplary embodiment.

FIG. 11 is a flowchart of a method of reconstructing a high-resolution image by using multi-layer low-resolution images, according to an exemplary embodiment.

Referring to FIG. 11, in operation 1110, a low-resolution image is divided into a plurality of texture layer low-resolution images and a plurality of base layer low-resolution images.

In operation 1120, a texture layer high-resolution image is generated by compositing the texture layer low-resolution images and a base layer high-resolution image is generated by compositing the base layer low-resolution images.

The texture layer high-resolution image may be generated by performing weighted sum filtering on a current frame of each of the texture layer low-resolution images, temporally neighboring frames and spatially neighboring frames and the base layer high-resolution image may be generated by performing weighted sum filtering on a current frame of each of the base layer low-resolution images, temporally neighboring frames and spatially neighboring frames. A weight used to perform weighted sum filtering may be determined based on at least one of spatial proximity or similarity, temporal proximity or similarity, luminance distances, proximity to a strong edge and reliability of motion estimation of neighboring frames with respect to a current frame.

In operation 1130, a high-resolution image is output by compositing the texture layer high-resolution image and the base layer high-resolution image. The high-resolution image may be generated by performing weighted average filtering on the texture layer high-resolution image and the base layer high-resolution image.

A weight for minimizing damage of texture layer image components of an original image may be determined with respect to the texture layer high-resolution image and a weight for smoothing the original image in consideration of an edge direction of the original image may be determined with respect to the base layer high-resolution image.

Filtering for restoring high-frequency components of a high-resolution image and filtering for preventing noise amplification may be performed to restore damaged high-frequency components of the high-resolution image.

As described above, according to exemplary embodiments, as weighted sum filtering for compositing individual layer high-resolution images and weighted sum filtering for restoring high-frequency components of a high-resolution image are performed, a high-resolution image may be reconstructed from a low-resolution image by reducing the amount of iterative calculation, minimizing damage of high-frequency components, and preventing noise amplification in consideration of temporally/spatially neighboring data.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description but by the following claims, and all differences within the scope will be construed as being included in the present invention.

What is claimed is:

1. A method of reconstructing a high-resolution image by using multi-layer low-resolution images, the method comprising:
dividing a low-resolution image into a plurality of texture layer low-resolution images and a plurality of base layer low-resolution images;

generating a texture layer high-resolution image by compositing the plurality of the texture layer low-resolution images and generating a base layer high-resolution image by compositing the plurality of the base layer low-resolution images; and outputting a high-resolution image by compositing the texture layer high-resolution image and the base layer high-resolution image, wherein the base layer low-resolution images include low-frequency components and strong directional edge components of the low-resolution image, and the texture layer low-resolution images include high-frequency components representing detail information obtained by excluding the low-frequency components and the strong directional edge components from low-resolution image, wherein the generating of the texture layer high-resolution image and the base layer high-resolution image comprises:

generating the texture layer high-resolution image by performing weighted sum filtering on a first current frame of each of the plurality of the texture layer low-resolution images, at least one first temporally neighboring frame of the first current frame and at least one first spatially neighboring frame of the first current frame; and generating the base layer high-resolution image by performing weighted sum filtering on a second current frame of each of the plurality of the base layer low-resolution images, at least one second temporally neighboring frame of the second current frame and at least one second spatially neighboring frame of the second current frame.

2. The method of claim 1, wherein the outputting of the high-resolution image further comprises restoring high-frequency components of the high-resolution image.

3. The method of claim 1, wherein the dividing of the low-resolution image comprises obtaining the plurality of the texture layer low-resolution images and the plurality of the base layer low-resolution images by dividing the low-resolution image into a plurality of low-resolution images and dividing each of the plurality of low-resolution images into a texture layer low-resolution image and a base layer low-resolution image.

4. The method of claim 1, wherein the dividing of the low-resolution image comprises obtaining the plurality of the base layer low-resolution images by excluding texture layer image components from the low-resolution image.

5. The method of claim 1, wherein the dividing of the low-resolution image comprises:

generating the plurality of the base layer low-resolution images by applying a filter for at least one of preserving edge components and smoothing an image, to the low-resolution image; and generating difference images between the low-resolution image and the plurality of the base layer low-resolution images, as the plurality of the texture layer low-resolution images.

6. The method of claim 1, wherein the generating of the texture layer high-resolution image and the base layer high-resolution image comprises:

generating the texture layer high-resolution image by performing non-iterative filtering on the plurality of the texture layer low-resolution images; and generating the base layer high-resolution image by performing non-iterative filtering on the plurality of the base layer low-resolution images.

7. The method of claim 1, wherein the at least one first temporally neighboring frame of the first current frame and the at least one spatially neighboring frame of the first current frame or the at least one second temporally neighboring frame of the second frame and the at least one second spatially neighboring frame of the second current frame are one of motion-estimated and motion-compensated frames with respect to the first current frame or the second current frame.

8. The method of claim 1, wherein a weight used to perform the weighted sum filtering is determined based on at least one of spatial proximity, temporal proximity, luminance differences, proximity to a strong edge and reliability of motion estimation of neighboring frames with respect to one of the first current frame and the second current frame.

9. The method of claim 1, wherein the outputting of the high-resolution image comprises generating the high-resolution image by performing weighted average filtering on the texture layer high-resolution image and the base layer high-resolution image.

10. The method of claim 9, wherein the weighted average filtering is performed by applying a first weight for minimizing damage of texture layer image components of an original image, to the texture layer high-resolution image, and applying a second weight for smoothing the original image in consideration of an edge direction of the original image, to the base layer high-resolution image.

11. The method of claim 2, wherein the restoring of the high-frequency components comprises restoring the high-frequency components of the high-resolution image by performing non-iterative filtering on the high-resolution image.

12. The method of claim 2, wherein the restoring of the high-frequency components comprises generating a high-resolution image by performing weighted sum filtering on at least one of the high-resolution image, a result of performing first filtering for restoring damaged high-frequency components of the high-resolution image, on the high-resolution image, and a result of performing second filtering for preventing noise amplification, on the high-resolution image.

13. The method of claim 12, wherein the first filtering is performed by using at least one bandpass filter that operates according to band characteristics of frequency bands.

14. The method of claim 12, wherein the second filtering is performed by using at least one bilateral filter that operates according to band characteristics of frequency bands.

15. The method of claim 1, wherein the low-resolution image is obtained by magnifying an original image.

16. The method of claim 5, wherein the filter for preserving edge components and smoothing an image comprises a bilateral filter.

17. An apparatus for reconstructing a high-resolution image by using multi-layer low-resolution images, the apparatus comprising:

a low-resolution image layer division unit for dividing a low-resolution image into a plurality of texture layer low-resolution images and a plurality of base layer low-resolution images;

a texture layer high-resolution image generation unit for generating a texture layer high-resolution image by compositing the plurality of the texture layer low-resolution images;

a base layer high-resolution image generation unit for generating a base layer high-resolution image by compositing the plurality of the base layer low-resolution images; and a high-resolution image composition unit for outputting a high-resolution image by compositing the texture layer high-resolution image and the base layer high-resolution image, wherein the base layer low-resolution images include low-frequency components and strong directional edge components of the low-resolution image, and the texture layer low-resolution images include high-frequency components representing detail information obtained by excluding the low-frequency components and the strong directional edge components from the low-resolution image, wherein the texture layer high-resolution image generation unit generates the texture layer high-resolution image by performing weighted sum filtering on a first current frame of each of the plurality of the texture layer low-resolution images, and at least one first temporally neighboring frame of the first current frame and at least one first spatially neighboring frame of the first current frame, by using the neighboring frames motion-compensated based on the motion information, and wherein the base layer high-resolution image generation unit generates the base layer high-resolution image by performing weighted sum filtering on a second current frame of each of the plurality of the base layer low-resolution images, and at least one temporally neighboring frame of the second current frame and at least one spatially neighboring frame of the second current frame, by using neighboring frames motion-compensated based on the motion information.

18. The apparatus of claim 17, wherein the high-resolution image composition unit comprises a high-frequency component restoration unit for restoring high-frequency components of the high-resolution image.

19. The apparatus of claim 17, further comprising a motion estimation unit for estimating motion information between a current frame of the low-resolution image and continuous neighboring frames of the current frame.

20. The apparatus of claim 17, wherein the high-resolution image composition unit generates the high-resolution image by performing weighted average filtering on the texture layer high-resolution image and the base layer high-resolution image.

21. The apparatus of claim 18, wherein the high-frequency component restoration unit generates the high-resolution image by performing weighted sum filtering on at least one of the high-resolution image, a result of performing first filtering for restoring damaged high-frequency components of the high-resolution image, on the high-resolution image, and a result of performing second filtering for preventing noise amplification, on the high-resolution image.

22. The apparatus of claim 17, wherein at least one of the texture layer high-resolution image generation unit, the base layer high-resolution image generation unit and the high-resolution image composition unit performs non-iterative weighted sum filtering on input images.

23. An apparatus for reconstructing a high-resolution image by using multi-layer low-resolution images, the apparatus comprising:

a low-resolution image multi-layer division unit for dividing an input low-resolution image into a plurality of individual layer low-resolution images with respect to each of a plurality of layers;

an individual layer high-resolution image generation unit for generating an individual layer high-resolution image by compositing the plurality of the individual layer low-resolution images with respect to each of the plurality of the layers; and a multi-layer high-resolution image composition unit for outputting a high-resolution image by compositing a plurality of individual layer high-resolution images generated with respect to the plurality of layers, wherein base layer low-resolution images include low-frequency components and strong directional edge components of the input low-resolution image, and the texture layer low-resolution images include high-frequency components representing detail information obtained by excluding the low-frequency components and the strong directional edge components from the input low-resolution image, wherein the plurality of individual layer high-resolution images comprise a generated texture layer high-resolution image and a generated base layer high-resolution image, wherein the texture layer high-resolution image is generated by performing weighted sum filtering on a first current frame of each of the plurality of the texture layer low-resolution images, at least one first temporally neighboring frame of the first current frame and at least one first spatially neighboring frame of the first current frame; and wherein the base layer high-resolution image is generated by performing weighted sum filtering on a second current frame of each of the plurality of the base layer low-resolution images, at least one second temporally neighboring frame of the second current frame and at least one second spatially neighboring frame of the second current frame.

24. non-transitory computer readable recording medium having recorded thereon a computer program for executing a method of reconstructing a high-resolution image by using multi-layer low-resolution images, the method comprising:

dividing a low-resolution image into a plurality of texture layer low-resolution images and a plurality of base layer low-resolution images;

generating a texture layer high-resolution image by compositing the plurality of the texture layer low-resolution images and generating a base layer high-resolution image by compositing the plurality of the base layer low-resolution images; and outputting a high-resolution image by compositing the texture layer high-resolution image and the base layer high-resolution image, wherein the base layer low-resolution images include low-frequency components and strong directional edge components of the low-resolution image, and the texture layer low-resolution images include high-frequency components representing detail information obtained by excluding the low-frequency components and the strong directional edge components from the low-resolution image, and wherein the generating of the texture layer high-resolution image and the base layer high-resolution image comprises:

generating the texture layer high-resolution image by performing weighted sum filtering on a first current frame of each of the plurality of the texture layer low-resolution images, at least one first temporally neighboring frame of the first current frame and at least one first spatially neighboring frame of the first current frame; and generating the base layer high-resolution image by performing weighted sum filtering on a second current frame of each of the plurality of the base layer low-resolution images, at least one second temporally neighboring frame of the second current frame and at least one second spatially neighboring frame of the second current frame.

25. A method of reconstructing a high-resolution image by using multi-layer low-resolution images, said method comprising:
dividing a low-resolution image into at least one texture layer low-resolution image and at least one base layer low-resolution image;
generating a texture layer high-resolution image based on said at least one texture layer low-resolution image;
generating a base layer high-resolution image based on said at least one base layer low-resolution image;
generating the high-resolution image based on said texture layer high-resolution image and said base layer high-resolution image,
wherein the base layer low-resolution images include low-frequency components and strong directional edge components of the low-resolution image, and the texture layer low-resolution images include high-frequency components representing detail information obtained by excluding the low-frequency components and the strong directional edge components from the low-resolution image,
wherein the generating of the texture layer high-resolution image and the base layer high-resolution image comprises:
generating the texture layer high-resolution image by performing weighted sum filtering on a first current frame of each of the at least one texture layer low-resolution image, at least one first temporally neighboring frame of the first current frame and at least one first spatially neighboring frame of the first current frame; and
generating the base layer high-resolution image by performing weighted sum filtering on a second current frame of each of the at least one of the base layer low-resolution image, at least one second temporally neighboring frame of the second current frame and at least one second spatially neighboring frame of the second current frame.

26. The method according to claim 25, wherein at least one of the base layer high-resolution image and texture layer high-resolution image is generated by performing non-iterative filtering.

27. An apparatus for reconstructing a high-resolution image by using multi-layer low-resolution images, the apparatus comprising:
a low-resolution image layer division unit for dividing a low-resolution image into at least one texture layer low-resolution image and at least one base layer low-resolution image;
a texture layer high-resolution image generation unit for generating a texture layer high-resolution image based on said at least one texture layer low-resolution image;
a base layer high-resolution image generation unit for generating a base layer high-resolution image based on said at least one base layer low-resolution image; and a high-resolution image composition unit for generating the high-resolution image based on said texture layer high-resolution image and said base layer high-resolution image,
wherein the base layer low-resolution images include low-frequency components and strong directional edge components of the low-resolution image, and the texture layer low-resolution images include high-frequency components representing detail information obtained by excluding the low-frequency components and the strong directional edge components from the low-resolution image,
wherein the texture layer high-resolution image generation unit generates the texture layer high-resolution image by performing weighted sum filtering on a first current frame of each of the at least one texture layer low-resolution image, and at least one first temporally neighboring frame of the first current frame and at least one first spatially neighboring frame of the first current frame, by using the neighboring frames motion-compensated based on the motion information, and
wherein the base layer high-resolution image generation unit generates the base layer high-resolution image by performing weighted sum filtering on a second current frame of each of the at least one base layer low-resolution image, and at least one temporally neighboring frame of the second current frame and at least one spatially neighboring frame of the second current frame, by using neighboring frames motion-compensated based on the motion information.

28. The apparatus according to claim 27, wherein at least one of the base layer high-resolution image and texture layer high-resolution image is generated by performing non-iterative filtering.

* * * * *